United States Patent [19]
Day et al.

[11] 3,797,924
[45] Mar. 19, 1974

[54] FILM FEEDING MECHANISM FOR MOTION PICTURE PROJECTORS

[75] Inventors: Donald Earl Day; Donald Oscar Easterly, both of Rochester, N.Y.

[73] Assignee: Eastman Kodak Company, Rochester, N.Y.

[22] Filed: Oct. 3, 1972

[21] Appl. No.: 294,708

[52] U.S. Cl............... 352/194, 352/180, 352/191
[51] Int. Cl.................. G03b 1/22, G03b 21/48
[58] Field of Search.......... 352/180, 181, 194, 195, 352/169

[56] References Cited
UNITED STATES PATENTS

| 3,672,755 | 6/1972 | Radl | 352/180 |
| 3,471,227 | 10/1969 | McClellan et al. | 352/169 |
| 3,584,774 | 6/1971 | Kadowaki | 352/194 |
| 3,580,668 | 5/1971 | Claar | 352/180 |

Primary Examiner—Joseph F. Peters, Jr.
Assistant Examiner—Russell E. Adams, Jr.

[57] ABSTRACT

A film feeding mechanism for a motion picture projector includes a member having a plurality of cam surfaces which cooperate with a cam follower for periodically causing a film claw to engage a filmstrip. Also included in the film feeding mechanism is a cooperating cam actuated means which is operative to periodically shift the cam follower between predetermined cam surfaces to provide projection speeds other than the speeds provided by any one of the cam surfaces individually.

7 Claims, 3 Drawing Figures

PATENTED MAR 19 1974

FILM FEEDING MECHANISM FOR MOTION PICTURE PROJECTORS

BACKGROUND OF THE INVENTION

1. Field of the Invention

This invention relates generally to an intermittent film feeding mechanism for a motion picture projector and more particularly to an improved mechanism which provides multiple projection rates.

2. Description of the Prior Art

It is known in the motion picture projector art to advance a perforated film through the projection gate of a motion picture projector by a film claw that is movable both in the film engaging direction which is perpendicular to the plane of film and in a film advancing direction which is parallel to the plane of the film. To achieve movement of the film claw in the film engaging direction, numerous cam arrangements have been used including a cam mechanism disclosed in commonly-assigned U.S. Pat. No. 3,261,654 entitled, "FILM FEEDING MECHANISM" and issued in the name of R. L. Faber et al. on July 19, 1966 wherein an axial or face cam has a plurality of cam surfaces which cooperate with a cam follower which is prepositioned to contact one of the various cam surfaces for controlling the frequency of movement of the claw in a film engaging direction.

Another common cam arrangement permits a predetermined periodic shifting of a cam follower from one cam surface to another to provide a variety of projection rates is disclosed in commonly assigned U.S. Pat. No. 3,671,113 entitled, "FILM FEEDING MECHANISM FOR MOTION PICTURE PROJECTORS" and issued in the name of R. B. Johnson on June 20, 1972. The mechanism disclosed in this patent includes an electrically-controlled mechanism which is effective to position the cam follower between different cam surfaces at appropriate frequencies to effect projection rates which cannot be achieved by the individual cam surfaces. The present invention achieves a similar result by incorporating a simple and highly reliable mechanical mechanism which is more readily assembled.

SUMMARY OF THE INVENTION

It is an object of this invention to provide an improved mechanical motion picture film transport mechanism for providing multiple film projection rates.

It is an object of this invention to provide a motion picture feeding mechanism which is simple and highly reliable for providing variable projection rates.

It is another object of the present invention to provide an improved film feeding mechanism for a motion picture projector, including means for periodically shifting a cam follower between a plurality of cam surfaces to achieve multiple projection rates.

It is a further object of the invention to provide a simple and reliable film feeding mechanism which is capable of multiple projection rates which can be achieved without providing additional cam surfaces for each such rate or without providing additional electrical means requiring more difficult assembly.

A preferred embodiment of the film feeding mechanism includes a film claw adapted to be moved by a first cam follower which follows a first cam having a plurality of cam surfaces. A second cam is driven synchronously with the first cam and is engaged by a second cam follower which is operatively coupled to means which causes the first cam follower to shift across the first cam to impart a different projection rate than provided by any individual cam surface.

The invention and its objects and advantages will become more apparent from the detailed description of the preferred embodiment of the invention presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Figure 1:
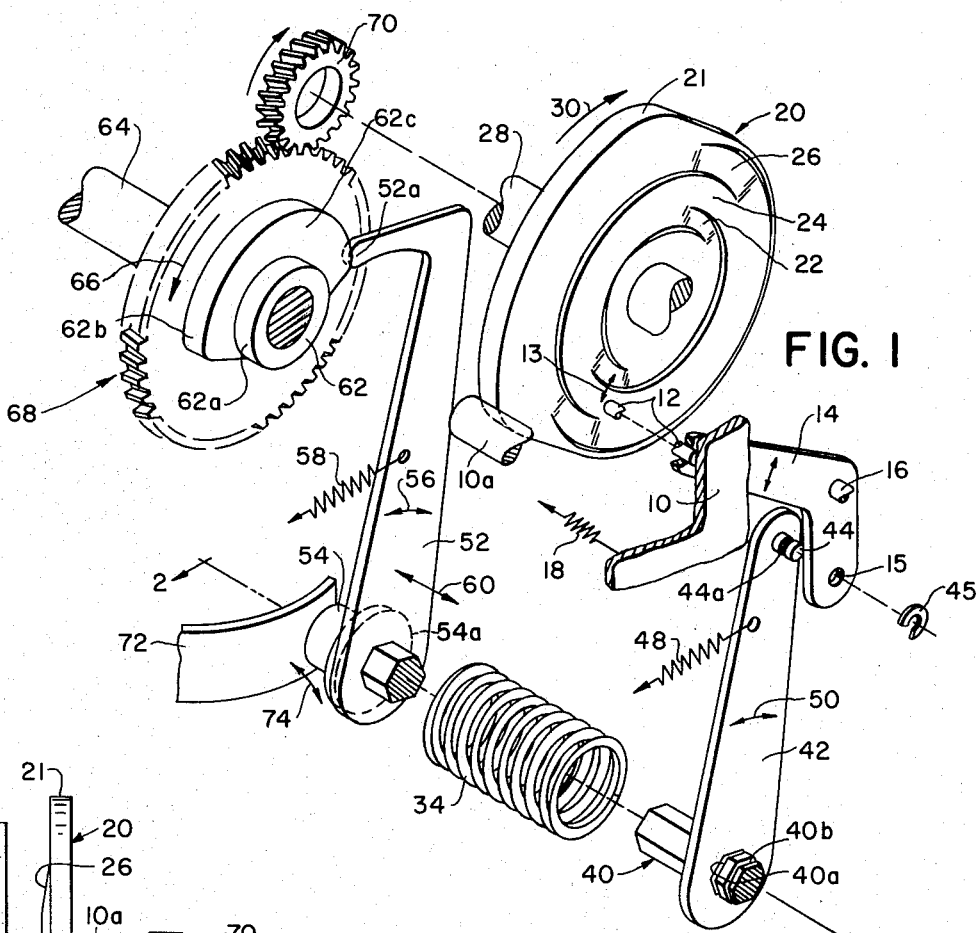
FIG. 1 is a partially exploded, perspective view of an intermittent pull-down mechanism for motion picture projector constructed in accordance with a preferred embodiment of the present invention.

Because motion picture projectors are well known, the present description will be directed in particular to elements forming a part of, or cooperating more directly with, apparatus in accordance with the present invention. It is to be understood that projector elements not specifically shown or described may take various forms well known to those skilled in the art.

Referring now to the drawings, a preferred embodiment of a film transport mechanism of this invention includes a film claw 10 which cooperates with a cam member for imparting movement to the claw to engage and advance a motion picture film. The film claw 10 is shown only partially in the drawings as it may be of any of several well known types such as those shown in commonly-assigned U.S. Pat. No's. 3,261,654 and 3,671,113. Preferably, claw 10 is supported by the projector housing for movement both in the film engaging and in the film advancing directions similar to the film claws disclosed in those patents.

A cam 20 cooperates with the film claw 10 to impart a generally rectilinear motion to the claw for engaging and advancing the film in either a "forward" or "reverse" direction or, for providing "still projection." Cam 20 includes a surface 21 which cooperates with an extension 10a of film claw 10 to drive the claw in the film advancing direction in a manner well known, and cam 20 also includes a plurality of cam surfaces which impart in-and-out movement to a cooperating cam follower 12 for causing movement of the film claw 10 in-and-out of film engaging direction. By way of example, the face cam 20 as illustrated in FIG. 1 has three concentric radially spaced annular cam surfaces 22, 24 and 26 of varied configurations which selectively cooperate with an in-and-out cam follower 12 which is interposed between the face of cam 20 and the surface of film claw 10. Cam follower 12 is selectively movable into engagement with one of the cam surfaces 22, 24 or 26 to achieve, respectively, "forward," "still" and "reverse" projection of the film. Cam follower 12 in the preferred embodiment is movable by a well known mechanism (not shown) for positioning in-and-out cam follower 12 for engaging each of the cam surfaces 22, 24 and 26 individually and is also provided with a mechanism for shifting the cam follower 12 between the cam surfaces to provide a projection rate which is different than the rate achieved by use of any of these cam surfaces individually.

In-and-out cam follower 12 is supported by an "L-shaped" or bell crank lever 14 which is mounted for pivotal movement (as indicated by arrow 15 in FIG. 1) about a shaft 16 that extends from a mechanism plate (not shown) of the projector. Lever 14 can be selectively pivoted about shaft 16 by known control mechanisms (not shown) to position the in-and-out cam follower 12 into contact with cam surfaces 22, 24 or 26 to provide fixed projection rates or as will be described in greater detail, a separate mechanism can be included to cause lever 14 to periodically shift the cam follower 12 between the cam surfaces so as to provide projection rates other than those provided individually by cam surfaces 22, 24 and 26. In the preferred embodiment shown, the mechanism to achieve this periodic shifting of cam follower 12 includes a cam actuated mechanical linkage which will now be described in detail.

Figure 2:
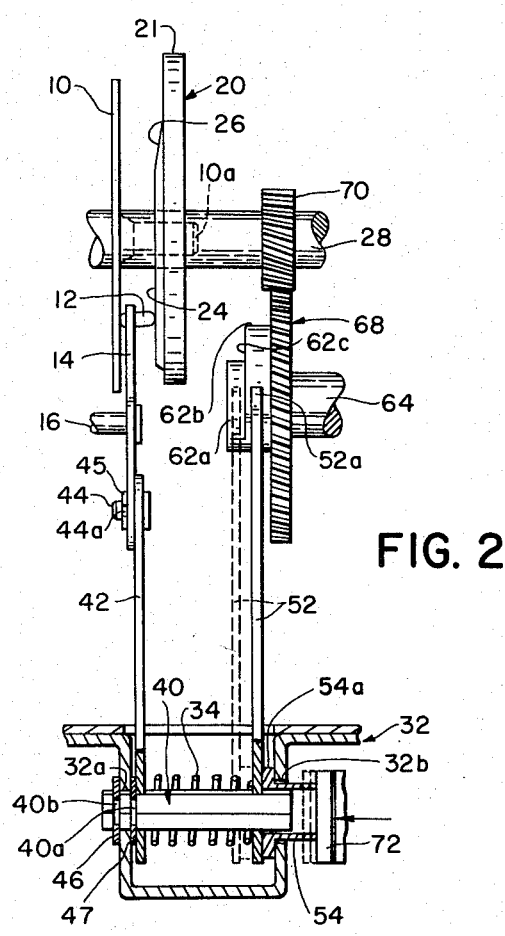
FIG. 2 is a plan view of the intermittent pull-down mechanism taken along line 2—2 of FIG. 1 as shown in the FIG. 1 position, showing in phantom how a portion of the mechanism is shifted to the operating position which is shown in FIG. 3 and also showing in cross-section a portion of the projector housing which supports a portion of the mechanism.

A shaft 40 is rotatably supported in the projector by a portion of the projector housing 32. As shown in FIG. 2, shaft 40 can be secured for rotation in openings 32a and 32b such as by horseshoe clips 46 and 47 which fit in grooves 40a and 40b, respectively, of shaft 40 (FIG'S. 1 and 3), the clips being on opposite sides of the openings 32a. Secured to shaft 40 is an arm 42 which includes a crankpin 44 extending therefrom near the end of the arm 42 away from shaft 40. Crankpin 44 is positioned in an opening 15 of lever 14 that is offset from pivot 16 to apply a driving force thereto for pivoting lever 14 about shaft 16 for positioning cam follower 12 upon the face of cam 20 relative to rotational movement of shaft 40. Crankpin 44 can be secured in the opening 15 by any known fastening means such as a horseshoe clip 45 which fits into a groove 44a in the surface of the crankpin (FIG'S. 1 and 3).

As shown in FIG. 2, an arm 52 is slidably secured to shaft 40 closely adjacent to one end of the shaft and a collar or cap 54 is slidably positioned over a portion of the end of shaft 40 and into contact with arm 52. Collar 54 extends through the opening 32b in the housing 32 and an enlarged portion 54a thereof is positioned between the arm 52 and the housing 32. A spring 34 coiled around shaft 40 between the arms 42 and 52 normally urges arms 42 and 52 toward opposite walls of housing 32.

In the preferred embodiment, shaft 40 has a hexagonal cross-section which cooperates with a similarly shaped aperture in arm 52 such that the arm can be slid axially along shaft 40 and yet a positive radial alignment is maintained between the arm 52 and arm 42. As will be understood, other mechanical connections, such as a key and slot arrangement, would also be suitable for maintaining this radial alignment of the arms with respect to shaft 40 so as to provide for accurate positioning of cam follower 12 upon the face of cam 20 as shaft 40 is caused to rotate by arm 52 in a manner to now be described.

A cam 62 is secured to a shaft 64 which is rotatably supported by the projector housing (not shown). The preferred embodiment of cam 62 includes two coaxial edge cam surfaces 62a and 62b which cooperate with a cam follower portion 52a of arm 52. While cam surface 62a is essentially of a fixed radius coaxial with the arm of shaft 64 such that cam follower 52a is not displaced during rotation of cam 62, cam surface 62b includes a first portion of an arc of approximately 180° which is of an enlarged radius which causes arm 52 to be pivoted back and forth when cam 62 is rotatably driven and cam follower 52a follows cam surface 62b. The other 180° portion of cam surface 62b is of the same radius as surface 62a so as to permit cam follower 52a to be readily shifted between the two cam surfaces 62a, 62b at least during a portion of the revolution of cam 62 as will be described in the discussion of the operation of the preferred mechanism.

Figure 3:
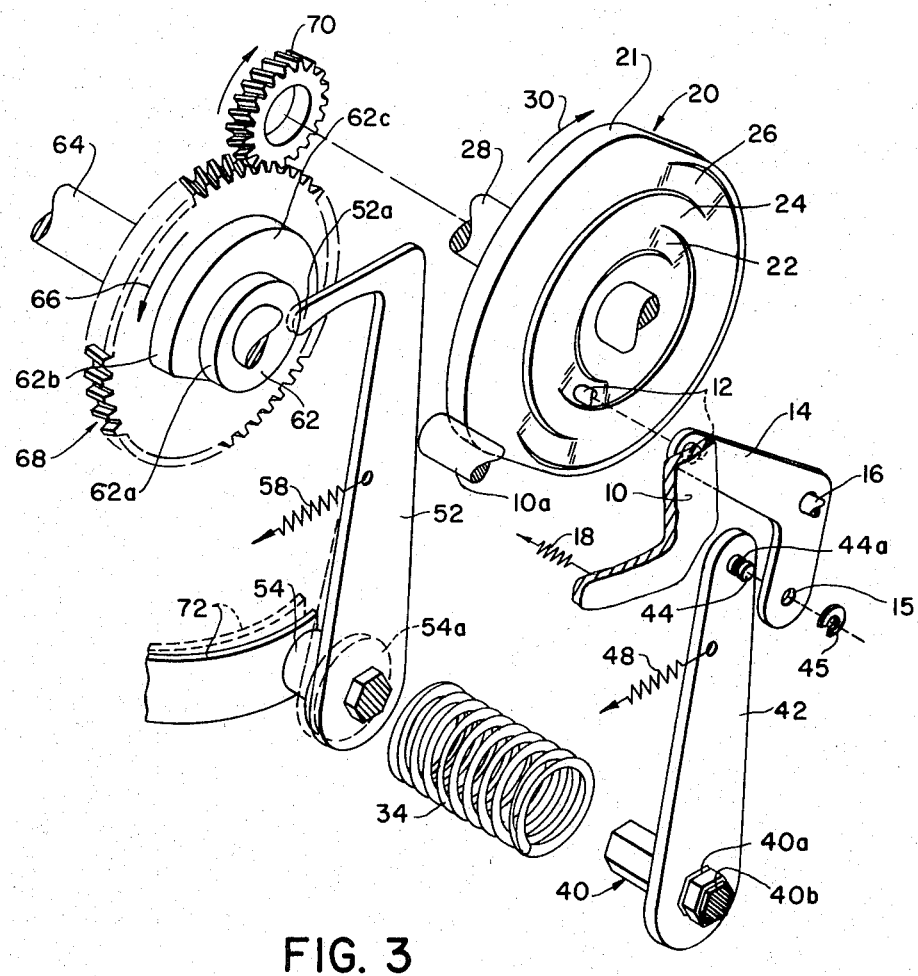
FIG. 3 is an exploded view similar to FIG. 1, with the mechanism shifted to a different operating position.

A shift lever 72 is pivotably mounted to the projector housing (not shown) and is effective to slide collar 54 and arm 52 along shaft 40 against the resilient force of spring 34. The shifting to the right of arm 52 by lever 72 by overcoming the urging of spring 34 is effective to move cam follower 52a from a position wherein it is in contact with cam surface 62b (FIG. 1 position) and into position wherein it is in contact with cam surface 62a (FIG. 3 position). Whenever shift lever 72 is again moved to the left (FIG. 1 position) spring 34 urges arm 52 and collar 54 away from arm 42 and cam follower 52a can once again assume a position to follow cam surface 62b. Since aligned portions of the cam surfaces 62a and 62b are of the same radius, shift lever can urge arm 52 to the right to contact surface 62a during any portion of the revolution of cam 62, and arm 52 can move to the left under the force of spring 34 to contact cam surface 62b whenever surface 62c of cam 62 does not restrain cam follower 52a (e.g. when cam follower 52a is aligned with the portion of cam surface 62b which is of the same radius as cam surface 62a).

As shown in the drawings, a gear 68 is secured to shaft 64 closely adjacent to cam 62 and preferably is integral therewith. Gear 68 is enmeshed with a gear 70 which is secured to shaft 28 at a spaced distance from cam 20. Through gears 68 and 70, cams 20 and 62 are driven synchronously as shaft 28 is driven by any known means, such as an electric motor (not shown). In the preferred embodiment illustrated, gear 70 has one-third the number of teeth as gear 68, therefore cam 52 is caused to be driven at one-third the speed of cam 20. Thus, where cam 20 is preferably driven at 18 revolutions per second, cam 62 is driven at 6 revolutions per second.

Now describing the operation of the disclosed projector mechanism in greater detail, let us first assume that shift lever 72 has positioned arm 52 in the position shown in FIG. 3 wherein cam follower 52a is in contact with cam surface 62a. In this position, springs 58 and 48 urge arms 52 and 42 respectively in a counterclockwise direction maintaining the arms in a fixed position as cam 62 is rotated by shaft 64. Also, lever 14 holds in-and-out cam follower 12 upon cam surface 22 as shown in FIG. 3. Thus, in the preferred embodiment where shaft 28 is driven at 18 revolutions per second, the in-and-out cam follower 12 cooperating with cam surface 22 causes film claw 10 to engage and advance a received film once per revolution of cam 20 resulting in a projection rate of 18 frames per second.

Assuming now that shift lever 72 is again moved to the left (FIG. 1 position), arm 52 is urged to the left by spring 34 wherein cam follower 52a is in contact with cam surface 62b (FIG. 1 position). In this position, cam follower 52a is urged by cam surface 62b to reciprocate back and forth as cam 62 is rotated and this results in arm 52 causing a corresponding rotational displacement of shaft 40. That is, as cam surface 62b rotates counterclockwise to the position illustrated in FIG. 1, cam follower 52a urges arm 52 and arm 42 through shaft 40 to rotate in a clockwise direction against the resilient force of springs 58 and 48. As arm 42 is rotated in this direction, crankpin 44 causes lever 14 to pivot in a counterclockwise direction about shaft 16 displacing cam follower 12 along the face of cam 20. This displacement of cam follower 52a by the enlarged portion of cam surface 62b is sufficient to cause cam follower 12 to be positioned upon cam surface 24 (as shown in FIG. 1) wherein the film claw 10 is held by cam follower 12 from engaging the film ("still" projection position). Continued counterclockwise rotation of cam 62 allows the cam follower 52a to once again return to the reduced portion of cam surface 62b permitting springs 58 and 48 to urge arms 42, 52 and shaft 40 to rotate back in counterclockwise direction. The movement of arm 42 in this direction causes lever 14 through crankpin 44 to be pivoted in a clockwise direction about shaft 16, thus moving cam follower 12 across the face of cam 20 and into position to follow cam surface 22. The resulting movement of cam follower 52a along the cam surface 62b thereby causes a synchronous movement of cam follower 12 across the face of cam 20. As a result, where in the preferred embodiment shaft 64 is rotated at 6 revolutions per second, cam follower 52a causes cam follower 12 to shift back and forth 6 times per second causing cam follower 12 to move claw 10 into engagement with the film and advance the film at a rate of 6 frames per second.

As may be understood from the above description of the operation of the feeding mechanism, other cams and gear relationships may be used to provide a variety of projection rates in both the forward and reverse modes of operation. While the invention has been described in detail with particular reference to a preferred embodiment thereof, it will be understood that variations and modifications can be effected within the spirit and scope of the invention.

We claim:

1. A film feeding mechanism for intermittently engaging and advancing a filmstrip at a plurality of projection rates, said mechanism comprising:
   a. a film claw;
   b. a first cam having at least first and second cam surfaces for providing first and second projection rates, respectively;
   c. a first cam follower interposed between said film claw and said first cam wherein it is (1) engageable with said first cam surface for moving said film claw at said first projection rate and (2) engageable with said second cam surface for moving said film claw at said second projection rate,
   d. a second cam having a plurality of cam surfaces;
   e. a second cam follower for cooperating with said second cam;
   f. means for synchronously driving said first and second cams;
   g. means for shifting said second cam follower between different ones of said plurality of cam surfaces of said second cam; and
   h. means interconnecting said first and second cam followers for moving said first cam follower periodically between said first and second cam surfaces of said first cam in response to movement of said second cam follower by one of said cam surfaces of said second cam such that said first cam follower can move said film claw at a third rate which is different from said first and second rates.

2. A film feeding mechanism as set forth in claim 1 wherein said means for synchronously driving said first cam and said second cams comprising:
   a. a first shaft which is secured to said first cam;
   b. a first gear which is secured to said first shaft, said first gear having N number of gear teeth;
   c. a second shaft which is non-rotatably coupled to said second cam; and
   d. a second gear secured to said second shaft; said second gear having N/3 number of gear teeth, said gear teeth being enmeshed with the gear teeth of said first gear.

3. A film feeding mechanism as set forth in claim 1 wherein said means interconnecting said first and second cam followers comprises:
   a. a rotatable shaft;
   b. a first arm secured to said shaft and coupled to said first cam follower, said first arm being movable in response to rotational movement of said shaft for causing said first cam follower to be shifted between said first and second cam surfaces of said first cam to impart said third rate of movement to said film claw; and
   c. a second arm secured to said shaft, said second arm being coupled to said second cam follower for causing rotation of said shaft in response to movement of said second cam follower by said one of said cam surfaces of said second cam.

4. In a film feeding mechanism having a film claw adapted to intermittently engage and advance a filmstrip and having a cam adapted to drive said film claw in the film advancing direction such that the filmstrip can be advanced at a plurality of projection rates, the improvement comprising:
   a. a first cam follower for cooperating with said film claw for imparting movements to said claw in the film engaging direction;
   b. a first cam including (1) a first cam surface which cooperates with said first cam follower for imparting a first rate of movement in the film engaging direction (2) a second cam surface which cooperates with said first cam follower for imparting a second rate of movement in the film engaging direction such that the film strip can be advanced at first and second projection rates, respectively;
   c. means for driving said first cam;
   d. a second cam;
   e. means for driving said second cam synchronous with said first cam;
   f. a second cam follower engageable with and movable in response to said second cam; and
   g. means operatively coupling said first and second cam followers such that movement of said second cam follower is effective to periodically move said first cam follower between said first and second cam surfaces of said first cam member in response to movement of said second cam follower by said second cam for imparting movement to said film claw in the film engaging direction such that the filmstrip can be advanced at a third projection rate which is different from said first and second projection rates and is a function of both said first and second projection rates.

5. For a film feeding mechanism having a film claw adapted to engage and advance a filmstrip and having a first cam including at least first and second cam surfaces for imparting movement to a first cam follower which is adapted to cooperate with said cam surfaces for moving said film claw to engagement with said filmstrip such that the filmstrip can be advanced at a first and a second projection rate, respectively, the improvement comprising:
 a. a second cam member;
 b. means for driving said second cam synchronously with said first cam;
 c. a second cam follower for cooperating with said second cam; and
 d. means operatively coupling said first and second cam followers for periodically moving said first cam follower responsive to movement of said second cam follower by said second cam member as said first and second cam members are driven, the movement of said first cam follower between said first and second cam surfaces of said first cam resulting in said first cam follower imparting a third rate of movement to said film claw such that the film claw engages and advances said filmstrip at a third projection rate, said third projection rate being different from said first and second projection rates and being a function of said rates.

6. In a film feeding mechanism as set forth in claim 5 wherein said means for operatively coupling said first and second cam followers comprises:
 a. a shaft rotatably supported by said film feeding mechanism;
 b. a first arm secured to said shaft and coupled to said first cam follower, said first arm movable in response to rotational movement of said shaft for causing said first cam follower to be shifted between different ones of said plurality of cam surfaces to impart said third rate of movement to said film claw;
 c. a second arm secured to said shaft, said second arm being coupled to said second cam follower for causing rotation of said shaft and thereby causing relative movement of said second cam follower.

7. In a film feeding mechanism as set forth in claim 6 wherein said cam means comprises a plurality of cam members and wherein said second arm is slidably and non-rotatably secured to said shaft such that said second cam follower can be shifted to cooperate with each of said plurality of cam members.

* * * * *